United States Patent
Ogawa (10) Patent No.: US 11,808,252 B2
(45) Date of Patent: Nov. 7, 2023

(54) LIQUID DELIVERY DEVICE AND LIQUID CHROMATOGRAPH

(71) Applicant: SHIMADZU CORPORATION, Kyoto (JP)

(72) Inventor: Keisuke Ogawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 562 days.

(21) Appl. No.: 17/054,788

(22) PCT Filed: May 16, 2018

(86) PCT No.: PCT/JP2018/018916
§ 371 (c)(1),
(2) Date: Nov. 12, 2020

(87) PCT Pub. No.: WO2019/220563
PCT Pub. Date: Nov. 21, 2019

(65) Prior Publication Data
US 2021/0231621 A1 Jul. 29, 2021

(51) Int. Cl.
*F04B 1/00* (2020.01)
*G01N 30/02* (2006.01)
(Continued)

(52) U.S. Cl.
CPC ............. *F04B 1/00* (2013.01); *F04B 13/02* (2013.01); *F04B 49/065* (2013.01); *G01N 30/02* (2013.01);
(Continued)

(58) Field of Classification Search
CPC .... B01D 15/14; B01D 15/163; B01D 15/166; B01D 15/18; B01F 2101/23;
(Continued)

(56) References Cited

U.S. PATENT DOCUMENTS 5,630,706 A * 5/1997 Yang ..................... G01N 30/36
417/18
5,664,938 A * 9/1997 Yang ..................... F04B 49/065
137/550
(Continued)

FOREIGN PATENT DOCUMENTS

JP 5-157743 A 6/1993
JP 2006118374 A * 5/2006 ............. F04B 49/06
(Continued)

OTHER PUBLICATIONS

International Search Report for corresponding Application No. PCT/JP2018/018916, dated Jul. 31, 2018.
(Continued)

*Primary Examiner* — David L Singer
(74) *Attorney, Agent, or Firm* — Renner, Otto, Boisselle & Sklar, LLP (57) ABSTRACT

The liquid delivery device includes a liquid delivery controller configured to operate, in a complementary manner, a primary plunger pump and a secondary plunger pump of each of a first liquid delivery pump and a second liquid delivery pump so that the first liquid delivery pump and the second liquid delivery pump perform continuous liquid delivery at a preset flow rate to each other, and a forcible synchronization part configured to forcibly synchronize operation states of the secondary plunger pumps of the first liquid delivery pump and the second liquid delivery pump by operating the primary plunger pump and the secondary
(Continued)

plunger pump of the first liquid delivery pump and the second liquid delivery pump at the calculated operation speed.

5 Claims, 4 Drawing Sheets

(51) Int. Cl.
*G01N 30/32* (2006.01)
*F04B 13/02* (2006.01)
*F04B 49/06* (2006.01)
*G01N 30/34* (2006.01)

(52) U.S. Cl.
CPC ....... *G01N 30/32* (2013.01); *G01N 2030/027* (2013.01); *G01N 2030/326* (2013.01); *G01N 2030/328* (2013.01); *G01N 2030/347* (2013.01)

(58) Field of Classification Search
CPC .... B01F 35/2202; F04B 1/00; F04B 11/0058; F04B 11/0075; F04B 13/00; F04B 13/02; F04B 2201/0202; F04B 23/06; F04B 49/06; F04B 49/065; F04B 49/20; F04B 9/02; G01N 2030/326; G01N 1/38; G01N 2030/027; G01N 2030/328; G01N 2030/347; G01N 30/02; G01N 30/32; G01N 30/34; G01N 30/38; G01N 30/8658; Y10T 137/0329
See application file for complete search history.

(56) References Cited

U.S. PATENT DOCUMENTS

| | | | | |
|---|---|---|---|---|
| 2004/0164013 | A1* | 8/2004 | Takao | F04B 11/0075 210/101 |
| 2005/0061722 | A1* | 3/2005 | Takao | G01N 30/32 417/5 |
| 2005/0084386 | A1* | 4/2005 | Mori | F04B 13/02 417/254 |
| 2006/0000759 | A1* | 1/2006 | Takao | G01N 30/32 210/198.2 |
| 2012/0055581 | A1* | 3/2012 | Akieda | G01N 30/32 141/36 |
| 2013/0104631 | A1* | 5/2013 | Tokuo | F04B 49/08 73/61.56 |
| 2014/0311228 | A1* | 10/2014 | Tanoue | G01N 30/32 73/61.55 |

FOREIGN PATENT DOCUMENTS

| | | | | |
|---|---|---|---|---|
| JP | 2006292392 | A | * 10/2006 | .............. G01N 30/32 |
| JP | 2007057539 | A | * 3/2007 | ........... F04B 11/0058 |
| JP | 2008291848 | A | * 12/2008 | .............. F04B 23/06 |
| WO | WO-9626000 | A1 | * 8/1996 | ........... B01F 13/0827 |

OTHER PUBLICATIONS

Written Opinion for corresponding Application No. PCT/JP2018/018916, dated Jul. 31, 2018 (partial English translation).

* cited by examiner

FIG. 4

LIQUID DELIVERY DEVICE AND LIQUID CHROMATOGRAPH

TECHNICAL FIELD

The present invention relates to a liquid delivery device including two liquid delivery pumps in which two plunger pumps are connected in series, and a liquid chromatograph using the liquid delivery device.

BACKGROUND ART

In liquid chromatography analysis, the reproducibility of an analysis result is known to be improved by synchronizing an injection timing of a sample into an analysis channel with a state of liquid delivery operation of a liquid delivery pump, that is, by injecting a sample when a liquid delivery pump reaches a predetermined state. For this reason, acquiring an operation cycle of a liquid delivery pump and determining an injection timing of a sample based on the operation cycle have been proposed (see Patent Document 1).

PRIOR ART DOCUMENTS

Patent Documents

Patent Document 1: Japanese Patent Laid-open Publication No. 5-157743

SUMMARY OF THE INVENTION

Problems to be Solved by the Invention

A binary pump equipped with two liquid delivery pumps is often used as a liquid delivery device for liquid chromatography. In a case where the binary pump is used as a liquid delivery device, in order to synchronize an injection timing of a sample with an operation state of the liquid delivery pump, injection of the sample needs to wait until a timing at which a state of the two liquid delivery pumps reaches a predetermined state.

In a case where a mobile phase is delivered at a very small flow rate of the order of μL/min, an operation cycle of the delivery pump becomes long due to a low operation speed of a plunger. Therefore, it takes a long time for states of the two liquid delivery pumps to reach the predetermined state at the same time. In a case where the injection timing of a sample is synchronized with an operation state of the liquid delivery pump, a long waiting time is required until the injection of the sample, which lowers the analysis efficiency. That is, conventionally, there has been a trade-off relationship between the analysis reproducibility and the analysis efficiency by the synchronization of the injection timing of a sample with the operation state of the liquid delivery pump.

The present invention has been made in view of the above problems, and it is an object of the present invention to achieve both analysis reproducibility and analysis efficiency by synchronization of the injection timing of a sample with the operating state of the liquid delivery pump.

Solutions to the Problems

A liquid delivery device which is a target of the present invention includes a first liquid delivery pump and a second liquid delivery pump that perform liquid delivery operation independently of each other. Each of the first liquid delivery pump and the second liquid delivery pump has a primary plunger pump and a secondary plunger pump which are driven independently of each other. The secondary plunger pump is connected in series downstream of the primary plunger pump.

In the first liquid delivery pump and the second liquid delivery pump, the secondary plunger pump performs suction operation during discharge operation of the primary plunger pump. A value obtained by subtracting a suction flow rate of the secondary plunger pump from a discharge flow rate of the primary plunger pump becomes a liquid delivery flow rate of the liquid delivery pump, and a discharge flow rate of the secondary plunger pump becomes a liquid delivery flow rate of the liquid delivery pump during the discharge operation of the secondary plunger pump. That is, a liquid delivery flow rate during the discharge operation of the primary plunger pump is determined by a relationship between the discharge flow rate of the primary plunger pump and the suction flow rate of the secondary plunger pump. Accordingly, the operation speed of the secondary plunger pump during the discharge operation of the primary plunger pump can be optionally adjusted without affecting the liquid delivery flow rate of the liquid delivery pump. By utilizing this, plungers of the secondary plunger pumps of the first liquid delivery pump and the second liquid delivery pump can be caused to reach the bottom dead center by adjusting the speed of the suction operation of the secondary plunger pumps of the first liquid delivery pump and the second liquid delivery pump, and the operation states of the first liquid delivery pump and the second liquid delivery pump can be forcibly synchronized.

The liquid delivery device according to the present invention has a function of forcibly synchronizing the operation states of the first liquid delivery pump and the second liquid delivery pump by utilizing the above matter. That is, the liquid delivery device according to the present invention includes a liquid delivery controller configured to operate, in a complementary manner, a primary plunger pump and a secondary plunger pump of each of the first liquid delivery pump and the second liquid delivery pump so that the first liquid delivery pump and the second liquid delivery pump perform continuous liquid delivery at preset flow rates for the respective liquid delivery pumps, and a forcible synchronization part configured, after receiving input of a synchronization signal indicating that operation states of the first liquid delivery pump and the second liquid delivery pump are to be synchronized, to calculate, when the primary plunger pump of the first liquid delivery pump and the primary plunger pump of the second liquid delivery pump become in a predetermined state after completing suction operation, an operation speed of the primary plunger pump of the first liquid delivery pump, an operation speed of the secondary plunger pump of the first liquid delivery pump, an operation speed of the primary plunger pump of the second liquid delivery pump, and an operation speed of the secondary plunger pump of the second liquid delivery pump necessary for causing plungers of the secondary plunger pump of the first liquid delivery pump and the secondary plunger pump of the second liquid delivery pump to reach the bottom dead center at the same time without affecting a liquid delivery flow rate of each of the first liquid delivery pump and the second liquid delivery pump, and to forcibly synchronize operation states of the secondary plunger pumps of the first liquid delivery pump and the second liquid delivery pump by operating the primary plunger pump of the first liquid delivery pump, the secondary plunger pump of the first liquid delivery pump, the primary plunger pump of the second liquid delivery pump, and the secondary plunger pump of the second liquid delivery pump at respective calculated operation speeds.

In the present application, "to synchronize the operation states of the first liquid delivery pump and the second liquid delivery pump" means to cause the plunger of the secondary plunger pump of the first liquid delivery pump and the plunger of each secondary plunger pump of the second liquid delivery pump to reach the bottom dead center at the same time.

In a preferred embodiment, the forcible synchronization part is configured to operate, when receiving input of the synchronization signal, the primary plunger pump and the secondary plunger pump of each of the first liquid delivery pump and the second liquid delivery pump so that the primary plunger pump of the first liquid delivery pump and the primary plunger pump of the second liquid delivery pump become in the predetermined state "in a shortest time". "In a shortest time" means that the suction operation is completed by switching the primary plunger pump to the suction operation (the secondary plunger pump to the discharge operation) in a manner that a liquid delivery flow rate of the liquid delivery pump is not affected regardless of the operation state of the primary plunger pump and the secondary plunger pump of the first liquid delivery pump and the second liquid delivery pump when the synchronization instruction is input, that is, even in a case where the primary plunger pump is performing the discharge operation when the synchronization instruction is input, and the primary plunger pump is caused to become in the predetermined state.

The predetermined state is, for example, a state in which a precompression operation for increasing pressure in a pump chamber of the primary plunger pump after completing suction operation to pressure in a pump chamber of the secondary plunger pump or pressure equivalent to the pressure is completed.

Operation speeds of the primary plunger pump and the secondary plunger pump of each of the first liquid delivery pump and the second liquid delivery pump when the forcible synchronization part forcibly synchronizes the operating states of the first liquid delivery pump and the second liquid delivery pump can be calculated, for example, as described below.

When a set flow rate of the first liquid delivery pump is A (μL/min), a set flow rate of the second liquid delivery pump is B (μL/min), a pulse position of a plunger of the secondary plunger pump of the first liquid delivery pump is X, a pulse position of a plunger of the secondary plunger pump of the second liquid delivery pump is Y when both the primary plunger pump of the first liquid delivery pump and the primary plunger pump of the second liquid delivery pump become in the predetermined state, and a suction speed of a plunger farther from the bottom dead center when both the primary plunger pump of the first liquid delivery pump and the primary plunger pump of the second liquid delivery pump become in the predetermined state is Q (μL/min), (1) In a case where $X>Y$,
    a discharge speed of the primary plunger pump of the first liquid delivery pump=$A+Q$
    a suction speed of the secondary plunger pump of the first liquid delivery pump=$Q$
    a discharge speed of the primary plunger pump of the second liquid delivery pump=$B+(Q \times Y/X)$
    a suction speed of the secondary plunger pump of the second liquid delivery pump=$Q \times Y/X$ (2) In a case where $X=Y$
    a discharge speed of the primary plunger pump of the first liquid delivery pump=$A+Q$
    a suction speed of the secondary plunger pump of the first liquid delivery pump=$Q$
    a discharge speed of the primary plunger pump of the second liquid delivery pump=$B+Q$
    a suction speed of the secondary plunger pump of the second liquid delivery pump=$Q$ (3) In a case where $X<Y$
    a discharge speed of the primary plunger pump of the first liquid delivery pump=$A+(Q \times Y/X)$
    a suction speed of the secondary plunger pump of the first liquid delivery pump=$Q \times X/Y$
    a discharge speed of the primary plunger pump of the second liquid delivery pump=$B+Q$
    a suction speed of the secondary plunger pump of the second liquid delivery pump=$Q$.

A liquid chromatograph according to the present invention includes: an analysis channel, the above liquid delivery device for delivering a mobile phase in the analysis channel, an autosampler for injecting a sample into the analysis channel, a separation column that is provided downstream of the autosampler on the analysis channel, and for separating a sample injected into the analysis channel by the autosampler into components, a detector that is provided downstream of the separation column on the analysis channel, and for detecting the components separated by the separation column, and an injection timing adjustment part configured to provide a synchronization instruction indicating that operation states of the first liquid delivery pump and the second liquid delivery pump are to be synchronized to the liquid delivery device when analysis of a sample is started, and provide an injection instruction indicating that a sample is to be injected into the analysis channel to the autosampler when operation states of the first liquid delivery pump and the second liquid delivery pump of the liquid delivery device are synchronized.

Effects of the Invention

The liquid delivery device according to the present invention includes a forcible synchronization part configured, after receiving input of a synchronization signal indicating that operation states of the first liquid delivery pump and the second liquid delivery pump are to be synchronized, to calculate, when the primary plunger pump of the first liquid delivery pump and the primary plunger pump of the second liquid delivery pump become in a predetermined state after completing suction operation, an operation speed of the primary plunger pump and the secondary plunger pump of the first liquid delivery pump and the second liquid delivery pump necessary for causing plungers of the secondary plunger pumps of the first liquid delivery pump and the second liquid delivery pump to reach the bottom dead center at the same time without affecting a liquid delivery flow rate of each of the first liquid delivery pump and the second liquid delivery pump, and to forcibly synchronize operation states of the secondary plunger pumps of the first liquid delivery pump and the second liquid delivery pump by operating each of the plunger pumps at respective calculated operation speeds. Accordingly, the operation states of the first liquid delivery pump and the second liquid delivery pump can be synchronized at high speed. In this manner, in the liquid chromatograph using the liquid delivery device, when an attempt is made to synchronize the injection timing of a sample with the operation state of the liquid delivery pump, the operation states of the first liquid delivery pump and the second liquid delivery pump are synchronized at high speed. Accordingly, the injection timing of a sample can be made earlier. This makes it possible to achieve both analysis reproducibility and analysis efficiency.

The liquid chromatograph according to the present invention includes the above liquid delivery device, and includes the injection timing adjustment part that is configured to provide a synchronization instruction indicating that operation states of the first liquid delivery pump and the second liquid delivery pump are to be synchronized to the liquid delivery device when analysis of a sample is started, and provide an injection instruction indicating that a sample is to be injected into the analysis channel to the autosampler when operation states of the first liquid delivery pump and the second liquid delivery pump of the liquid delivery device are synchronized. Accordingly, improvement in analysis reproducibility can be achieved by synchronizing the sample injection timing with the operation states of the first liquid delivery pump and the second liquid delivery pump of the liquid delivery device, and also improvement in analysis efficiency can be achieved by high-speed synchronization of the operation states of the first liquid delivery pump and the second liquid delivery pump.

EMBODIMENTS OF THE INVENTION

Hereinafter, an embodiment of a liquid delivery device according to the present invention and an embodiment of a liquid chromatograph including the liquid delivery device will be described with reference to the drawings.

Figure 1:
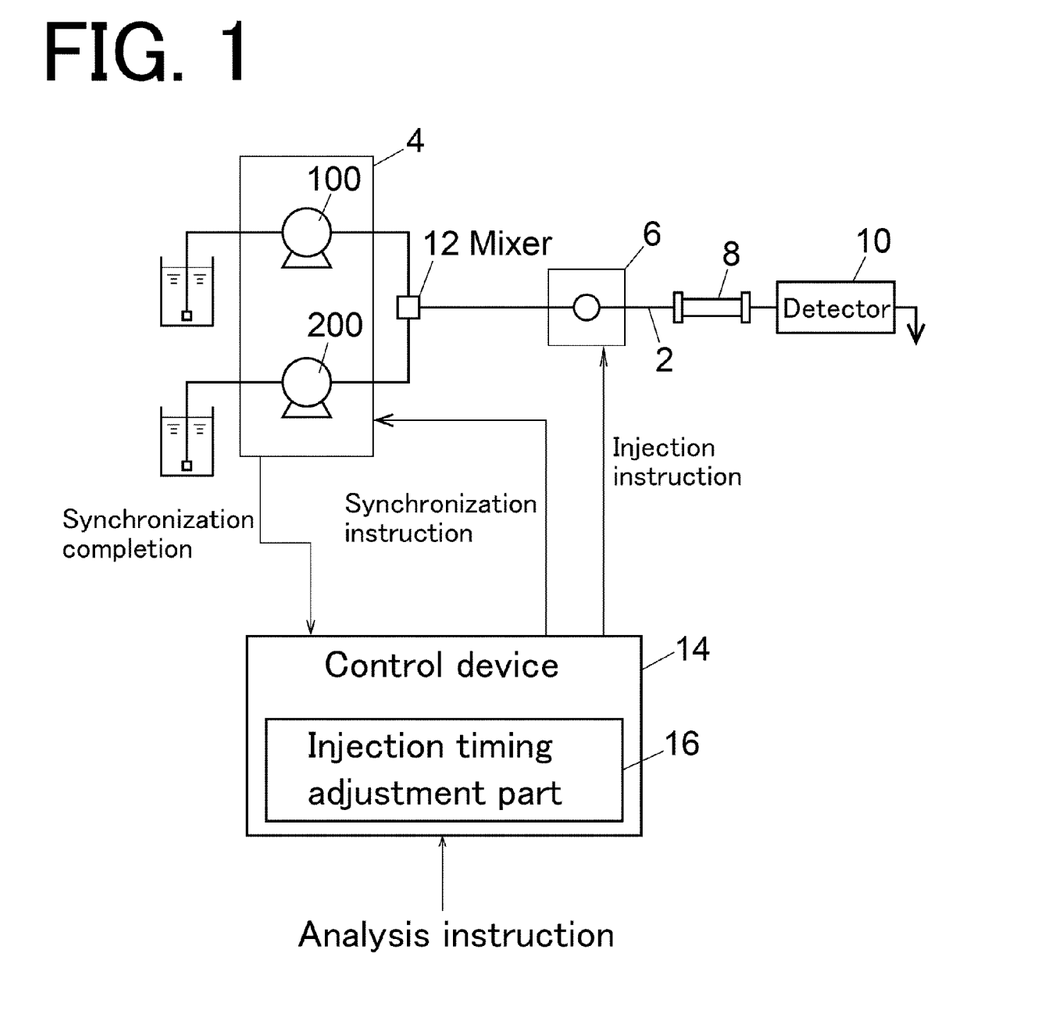
FIG. 1 is a configuration diagram showing an embodiment of a liquid chromatograph.

First, an embodiment of the liquid chromatograph will be described with reference to FIG. 1.

The liquid chromatograph includes an analysis channel 2, a liquid delivery device 4, an autosampler 6, a separation column 8, a detector 10, and a control device 14. The liquid delivery device 4 is a binary pump including a first liquid delivery pump 100 and a second liquid delivery pump 200 that operate independently of each other, and is configured to deliver two kinds of solvents by the liquid delivery pumps 100 and 200. The solvents delivered by the first liquid delivery pump and the second liquid delivery pump 100 and 200 of the liquid delivery device 4 are mixed in a mixer 12 and flow through the analysis channel 2 as a mobile phase. In FIG. 1, the mixer 12 is illustrated as being provided independently of the liquid delivery device 4. However, the mixer 12 may be included as part of constituents of the liquid delivery device 4.

The autosampler 6 is for injecting a sample into the analysis channel 2 in which the mobile phase from the liquid delivery device 4 flows. The separation column 8 is provided downstream of the autosampler 6 on the analysis channel 2 and is for separating a sample injected into the analysis channel 2 by the autosampler 6. The detector 310 is provided downstream of the separation column 8 on the analysis channel 2 and is for detecting a sample component separated in the separation column 8.

The control device 14 is for performing operation management of the liquid chromatograph, and can be realized by a dedicated computer or a general-purpose personal computer. The control device 14 includes an injection timing adjustment part 16. The injection timing adjustment part 16 is a function obtained when an arithmetic element, such as a microcomputer, provided in the control device 14 executes a predetermined program.

The injection timing adjustment part 16 is a function for synchronizing the injection timing of a sample with operation states of the first liquid delivery pump and the second liquid delivery pump 100 and 200 of the liquid delivery device 4. Although a detailed configuration of the liquid delivery device 4 will be described later, the liquid delivery device 4 has a function of forcibly bringing the first liquid delivery pump and the second liquid delivery pump 100 and 200 into a predetermined state at the same time so as to forcibly synchronize the first liquid delivery pump and the second liquid delivery pump 100 and 200. The injection timing adjustment part 16 is configured to provide, to the liquid delivery device 4, a synchronization instruction indicating that the first liquid delivery pump and the second liquid delivery pump 100 and 200 should be forcibly synchronized when an analysis instruction indicating that analysis should be started is input to the control device 14, and provide, to the autosampler 6, an injection instruction indicating that a sample should be injected into the analysis channel 2 when synchronization of the first liquid delivery pump and the second liquid delivery pump 100 and 200 is completed in the liquid delivery device 4.

Figure 3:
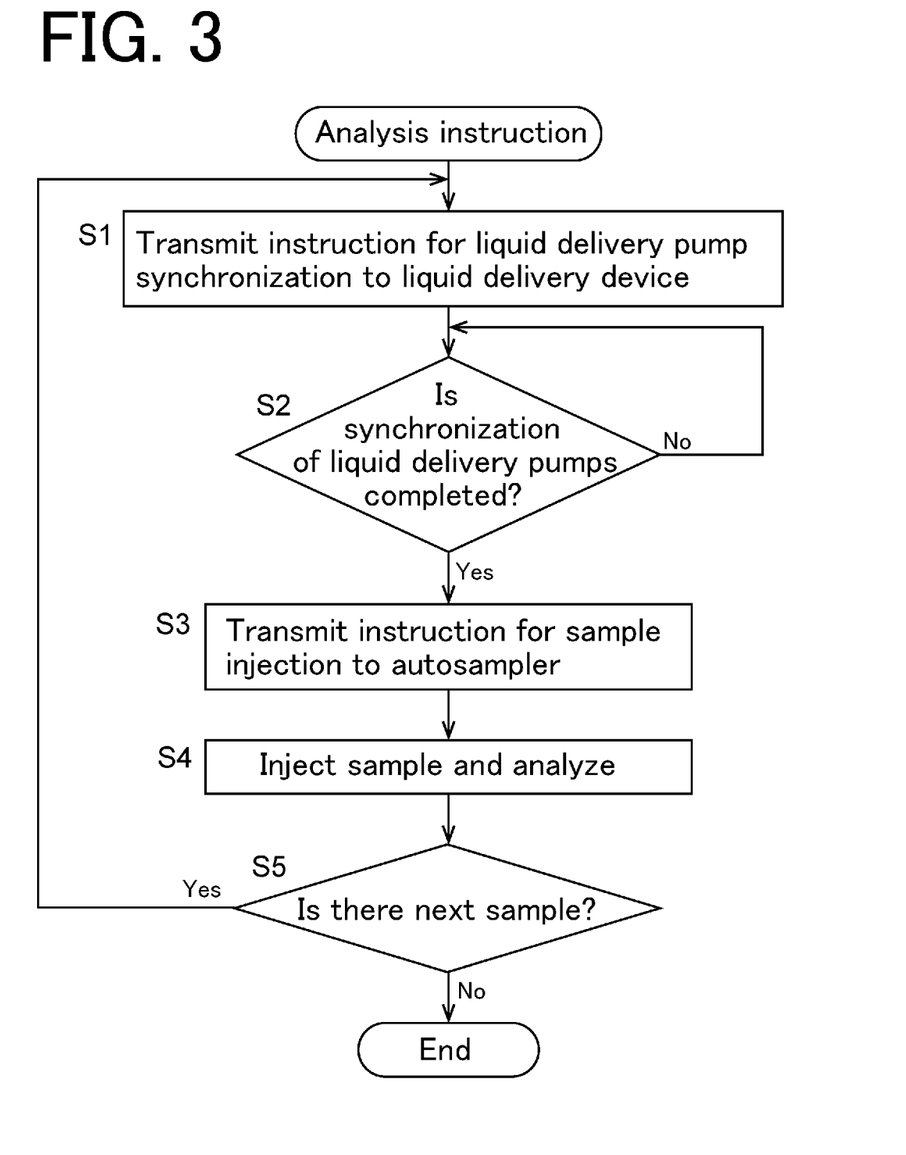
FIG. 3 is a flow chart for explaining an example of operation of the liquid chromatograph that receives an analysis instruction.

Due to the function of the injection timing adjustment part 16, the liquid chromatograph of the present embodiment operates as shown in a flowchart of FIG. 3.

When the analysis instruction is input to the control device 14, the injection timing adjustment part 16 provides a synchronization instruction to the liquid delivery device (Step S1). Upon receiving the synchronization instruction, the liquid delivery device 4 starts operation of synchronizing operation states of the first liquid delivery pump and the second liquid delivery pump 100 and 200. When the synchronization of the operation states of the first liquid delivery pump and the second liquid delivery pump 100 and 200 in the liquid delivery device 4 is completed (Step S2), a signal indicating the completion of the synchronization is sent from the liquid delivery device 4 to the control device 14. The injection timing adjustment part 16 transmits an instruction of sample injection into the analysis channel 2 to the autosampler 6 when the synchronization of operation states of the first liquid delivery pump and the second liquid delivery pump 100 and 200 in the liquid delivery device 4 is completed (Step S3). The autosampler 6 to which the instruction of sample injection is provided injects a sample into the analysis channel 2, so that the analysis of the sample is executed (Step S4). After the analysis of the sample is completed, in a case where there exists a sample to be continuously analyzed (Step S5), the operation of Steps S1 to S4 is repeated.

Figure 2:
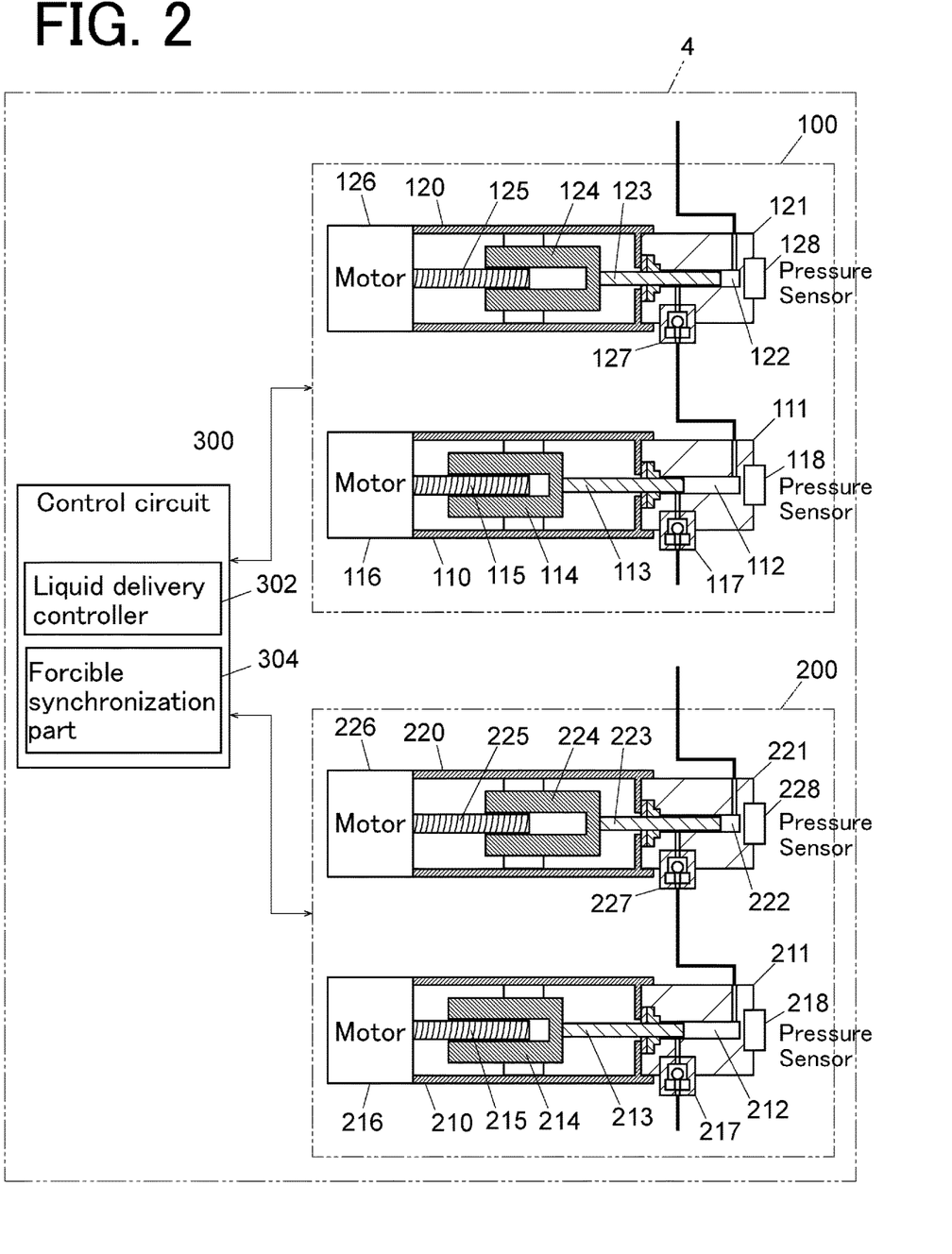
FIG. 2 is a schematic configuration diagram showing a configuration example of a liquid delivery device of the embodiment.

An example of the configuration of the liquid delivery device 4 will be described with reference to FIG. 2.

The first liquid delivery pump 100 of the liquid delivery device 4 includes a primary plunger pump 110 and a secondary plunger pump 120 that are driven independently of each other, and the second liquid delivery pump 200 includes a primary plunger pump 210 and a secondary plunger pump 220 that are driven independently of each other.

The primary plunger pump 110 of the first liquid delivery pump 100 is configured so that a crosshead 114 that holds a proximal end of a plunger 113 move in an axial direction of a ball screw 115 as the ball screw 115 rotates so that the plunger 113 slides in a pump chamber 112 provided in a pump head 111. The ball screw 115 is rotated by a stepping motor 116. The pump head 111 is provided with a pressure sensor 118 for detecting pressure in the pump chamber 112. A check valve 117 is provided in an inlet portion of the pump chamber 112. An outlet portion of the pump chamber 112 is connected to an inlet portion of a pump chamber 122 of the secondary plunger pump 120 via a check valve 127.

The secondary plunger pump 120 of the first liquid delivery pump 100 has a configuration similar to that of the primary plunger pump 110, and is configured so that a crosshead 124 that holds a proximal end of a plunger 123 move in an axial direction of a ball screw 125 as the ball screw 125 rotates so that the plunger 123 slides in the pump chamber 122 provided in a pump head 121. The ball screw 125 is rotated by a stepping motor 126. The pump head 121 is provided with a pressure sensor 128 for detecting pressure in the pump chamber 122.

The primary plunger pump 210 and the secondary plunger pump 220 of the second liquid delivery pump 200 includes constituents 211 to 218 and 221 to 228 corresponding to the constituents 111 to 118 and 121 to 128 of the primary plunger pump 110 and the secondary plunger pump 210 of the first liquid delivery pump 100.

The liquid delivery device 4 includes a control circuit 300 for controlling operation of the primary plunger pump and the secondary plunger pump 110, 120, 210, and 220 of the first liquid delivery pump and the second liquid delivery pump 100 and 200. The control circuit 300 includes a liquid delivery controller 302 and a forcible synchronization part 304. The liquid delivery controller 302 and the forcible synchronization part 304 are functions obtained by an arithmetic element such as a microcomputer provided in the control circuit 300 executing a predetermined program.

The liquid delivery controller 302 is configured to cause the primary plunger pump and the secondary plunger pump 110 and 120 of the first liquid delivery pump 100 and the primary plunger pump and the secondary plunger pump 210 and 220 of the second liquid delivery pump 200 to operate complementarily, so as to adjust a liquid delivery flow rate of the first liquid delivery pump and the second liquid delivery pump 100 and 200 to a set flow rate.

The forcible synchronization part 304 is configured to synchronize operation states of the first liquid delivery pump and the second liquid delivery pump 100 and 200 when a synchronization instruction is provided from the control device 14. Synchronizing the operation states of the first liquid delivery pump and the second liquid delivery pump 100 and 200 means that the plungers 123 and 223 of the secondary plunger pumps 120 and 220 of the first liquid delivery pump and the second liquid delivery pump 100 and 200 are caused to reach the bottom dead center at the same time.

Figure 4:
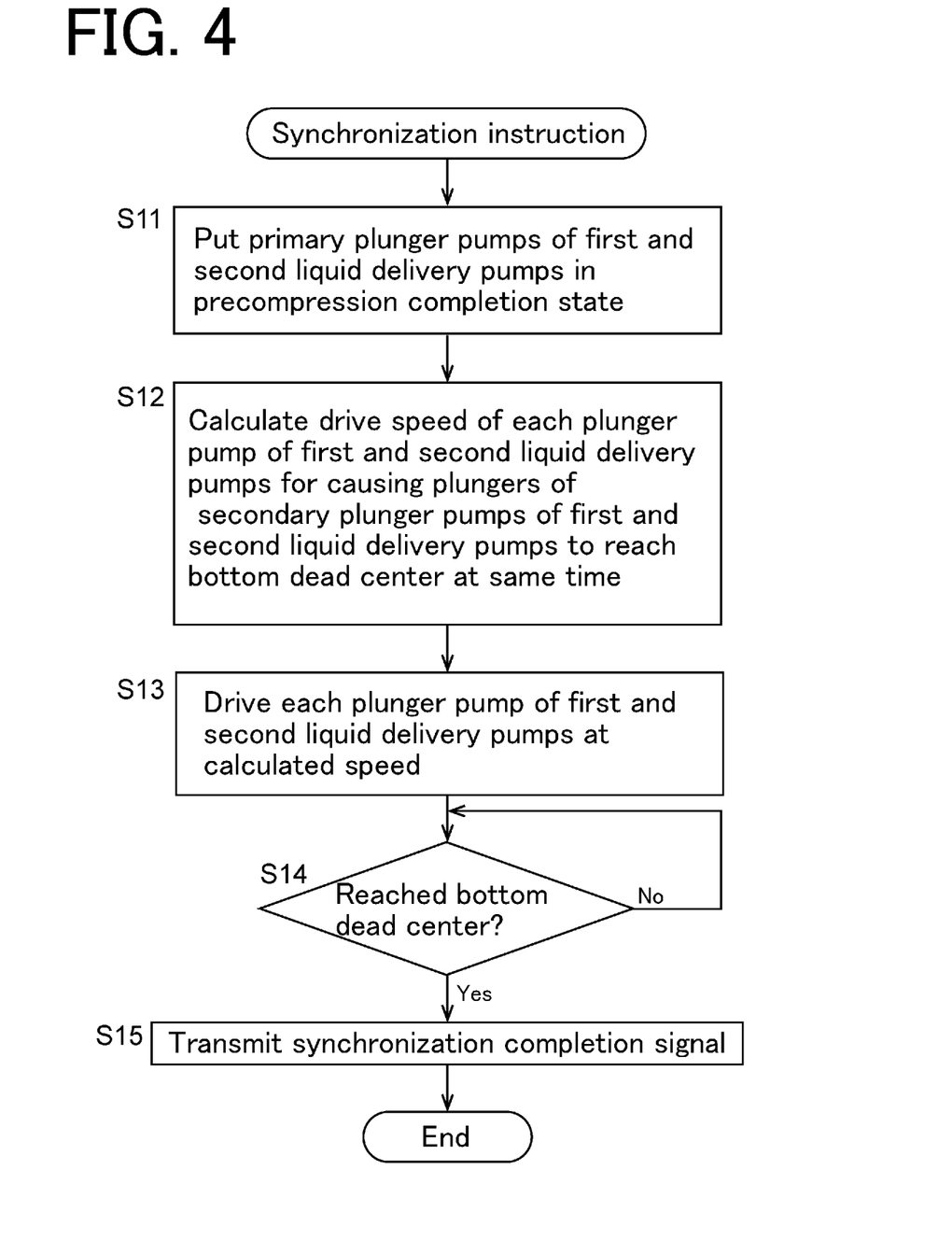
FIG. 4 is a flowchart for explaining an example of operation of the liquid delivery device that receives a synchronization instruction.

The operation of synchronizing the operation states of the first liquid delivery pump and the second liquid delivery pump 100 and 200 will be described with reference to a flowchart of FIG. 4.

When the synchronization instruction is input to the control circuit 300, the forcible synchronization part 304 brings both the first liquid delivery pump and the second liquid delivery pump 110 and 210 of the first liquid delivery pump and the second liquid delivery pump 100 and 200 into a precompression completion state regardless of the operation states of the first liquid delivery pump 100 and the second liquid delivery pump 200 (Step S11). When the primary plunger pump 110 or 210 of one of the liquid delivery pumps 100 and 200 becomes in the precompression completion state before the other, the plunger pump waits in the precompression completion state until the other becomes in the precompression completion state.

In a case where the primary plunger pump 110 is performing discharge operation (the secondary plunger pump 120 is performing suction operation) in the first liquid delivery pump 100 when the synchronization instruction is provided to the control circuit 300, the primary plunger pump 110 is switched to the suction operation (the secondary plunger pump 120 is switched to the discharge operation), and the suction operation and the precompression operation of the primary plunger pump 110 are completed. Further, in a case where the primary plunger pump 110 is performing the suction operation (the secondary plunger pump 120 is performing the discharge operation) when the synchronization instruction is provided to the control circuit 300, the discharge operation by the secondary plunger pump 120 is continued, and the suction operation and the precompression operation of the primary plunger pump 110 are completed. When the secondary plunger pump 120 is performing the discharge operation, an operation speed of the primary plunger pump 110 does not affect a liquid delivery flow rate of the first liquid delivery pump 100. Accordingly, the suction operation and the precompression operation of the primary plunger pump 110 after the synchronization instruction is provided are preferably performed at as high speed as possible.

The above similarly applies to a case where the primary plunger pump 210 is performing the discharge operation (the secondary plunger pump 220 is performing the suction operation) in the second liquid delivery pump 200 and to a case where the secondary plunger pump 210 is performing the suction operation (the secondary plunger pump 220 is performing the discharge operation) when the synchronization instruction is provided to the control circuit 300.

When both the primary plunger pumps 110 and 210 of the first liquid delivery pump and the second liquid delivery pump 100 and 200 are in the precompression completion state, the forcible synchronization part 304 calculates positions (distances from the bottom dead center) of the plungers 123 and 223 of the secondary plunger pumps 120 and 220 at that time point from the numbers of pulses of the stepping motors 126 and 226, and calculates a drive speed of the plunger pumps 110, 120, 210, and 220 required to cause the plungers 123 and 223 to reach the bottom dead center at the same time without affecting a liquid delivery flow rate of the first liquid delivery pump and the second liquid delivery pump 100 and 200 (Step S12).

As an example, when a set flow rate of the first liquid delivery pump 100 is A (μL/min), a set flow rate of the second liquid delivery pump 200 is B (μL/min), a pulse position of the plunger 123 of the secondary plunger pump 120 when both the primary plunger pumps 110 and 210 become in the precompression completion state is X (a pulse position of the bottom dead center is zero), a pulse position of the plunger 223 of the secondary plunger pump 220 is Y (a pulse position of the bottom dead center is zero), and a suction speed of a plunger that is farther from the bottom dead center when both the primary plunger pumps 110 and 210 are in the precompression completion state is Q (μL/ min), an operation speed of the plunger pumps 110, 120, 210, and 220 can be calculated as described below.

In a case where $X>Y$, (1)

Discharge speed of primary plunger pump $110=A+Q$

Suction speed of secondary plunger pump $120=Q$

Discharge speed of primary plunger pump $210=B+(Q\times Y/X)$

Suction speed of secondary plunger pump $220=Q\times Y/X$

In a case where $X=Y$ (2)

Discharge speed of primary plunger pump $110=A+Q$

Suction speed of secondary plunger pump $120=Q$

Discharge speed of primary plunger pump $210=B+Q$

Suction speed of secondary plunger pump $220=Q$

In a case where $X<Y$ (3)

Discharge speed of primary plunger pump $110=A+(Q\times X/Y)$

Suction speed of secondary plunger pump $120=Q\times X/Y$

Discharge speed of primary plunger pump $210=B+Q$

Suction speed of secondary plunger pump $220=Q$

The forcible synchronization part 304 calculates the operation speed of each of the plunger pumps 110, 120, 210, and 220 as described above, and then operates each of the plunger pumps 110, 120, 210, and 220 at the obtained speed (Step S13), and causes the plungers 123 and 223 of the secondary plunger pumps 120 and 220 to reach the bottom dead center at the same time (Step S14). In this manner, the synchronization of the operation states of the first liquid delivery pump and the second liquid delivery pump 100 and 200 is completed. When the synchronization of the operation states of the first liquid delivery pump and the second liquid delivery pump 100 and 200 is completed, the control circuit 300 sends a synchronization completion signal indicating that the synchronization is completed to the control device 14 (see FIG. 1) (Step S15).

As described above, in the present embodiment, when the analysis instruction is input, the liquid delivery device 4 performs the operation of forcibly synchronizing the operation states of the two liquid delivery pumps 100 and 200 due to the input instruction. In this manner, the operation states of the liquid delivery pumps 100 and 200 are synchronized at high speed without waiting for the operation cycle of the liquid delivery pumps 100 and 200. Accordingly, sample injection can be performed at high speed in synchronization with the operation states of the liquid delivery pumps 100 and 200. That is, in the above-described embodiment, both improvement in the analysis reproducibility and improvement in the analysis efficiency are realized by synchronizing the sample injection with the operation states of the liquid delivery pumps 100 and 200.

DESCRIPTION OF REFERENCE SIGNS

2: Analysis channel
4: Liquid delivery device
6: Autosampler
8: Separation column
10: Detector
12: Mixer
14: Control device
16: Injection timing adjustment part
100: First liquid delivery pump
200: Second liquid delivery pump
110, 210: Primary plunger pump
120, 220: Secondary plunger pump
111, 121, 211, 221: Pump head
112, 122, 212, 222: Pump chamber
113, 123, 213, 223: Plunger
114, 124, 214, 224: Crosshead
115, 125, 215, 225: Ball screw
116, 126, 216, 226: Stepping motor
117, 127, 217, 227: Check valve
118, 128, 218, 228: Pressure sensor
300: Control circuit
302: Liquid delivery controller
304: Forcible synchronization part

The invention claimed is:

1. A liquid delivery device comprising:
a first liquid delivery pump and a second liquid delivery pump that perform liquid delivery operation independently of each other, each of the first liquid delivery pump and the second liquid delivery pump having a primary plunger pump and a secondary plunger pump driven independently of each other, the secondary plunger pump being connected in series downstream of the primary plunger pump;
a liquid delivery controller configured to operate, in a complementary manner, the primary plunger pump and the secondary plunger pump of each of the first liquid delivery pump and the second liquid delivery pump so that the first liquid delivery pump and the second liquid delivery pump perform continuous liquid delivery at preset flow rates for the respective liquid delivery pumps; and
a forcible synchronization part configured, after receiving input of a synchronization signal indicating that operation states of the first liquid delivery pump and the second liquid delivery pump are to be synchronized, to calculate, when the primary plunger pump of the first liquid delivery pump and the primary plunger pump of the second liquid delivery pump become in a predetermined state after completing suction operation, an operation speed of the primary plunger pump of the first liquid delivery pump, an operation speed of the secondary plunger pump of the first liquid delivery pump, an operation speed of the primary plunger pump of the second liquid delivery pump, and an operation speed of the secondary plunger pump of the second liquid delivery pump necessary for causing a plunger of the secondary plunger pump of the first liquid delivery pump and a plunger of the secondary plunger pump of the second liquid delivery pump to reach a bottom dead center at the same time without affecting a liquid delivery flow rate of each of the first liquid delivery pump and the second liquid delivery pump, and to forcibly synchronize operation states of the secondary plunger pump of the first liquid delivery pump and the secondary plunger pump of the second liquid delivery pump by operating the primary plunger pump of the first liquid delivery pump, the secondary plunger pump of the first liquid delivery pump, the primary plunger pump of the second liquid delivery pump, and the secondary plunger pump of the second liquid delivery pump at respective calculated operation speeds.

2. The liquid delivery device according to claim 1, wherein
the forcible synchronization part is configured to operate, when receiving input of the synchronization signal, the primary plunger pump of the first liquid delivery pump, the secondary plunger pump of the first liquid delivery pump, the primary plunger pump of the second liquid delivery pump, and the secondary plunger pump of the second liquid delivery pump so that the primary plunger pump of the first liquid delivery pump and the primary plunger pump of the second liquid delivery pump become in the predetermined state in a shortest time.

3. The liquid delivery device according to claim 1, wherein
the predetermined state is a state in which a precompression operation for increasing pressure in a pump chamber of the primary plunger pump after completing suction operation to pressure in a pump chamber of the secondary plunger pump or pressure equivalent thereto is completed.

4. The liquid delivery device according to claim 1, wherein
in a case where
a set flow rate of the first liquid delivery pump is A ($\mu$L/min),
a set flow rate of the second liquid delivery pump is B ($\mu$L/min),
a pulse position of the plunger of the secondary plunger pump of the first liquid delivery pump is X, a pulse position of the plunger of the secondary plunger pump of the second liquid delivery pump is Y when both the primary plunger pump of the first liquid delivery pump and the primary plunger pump of the second liquid delivery pump become in the predetermined state, and
a suction speed of a plunger farther from the bottom dead center when both the primary plunger pump of the first liquid delivery pump and the primary plunger pump of the second liquid delivery pump become in the predetermined state is Q ($\mu$L/min),
the forcible synchronization part is configured to calculate an operation speed of each plunger pump as follows:

In a case where $X > Y$, (1)

a discharge speed of the primary plunger pump of the first liquid delivery pump$=A+Q$ a suction speed of the secondary plunger pump of the first liquid delivery pump$=Q$ a discharge speed of the primary plunger pump of the second liquid delivery pump$=B+(Q \times Y/X)$ a suction speed of the secondary plunger pump of the second liquid delivery pump$=Q \times Y/X$ In a case where $X=Y$ (2)

a discharge speed of the primary plunger pump of the first liquid delivery pump$=A+Q$ a suction speed of the secondary plunger pump of the first liquid delivery pump$=Q$ a discharge speed of the primary plunger pump of the second liquid delivery pump$=B+Q$ a suction speed of the secondary plunger pump of the second liquid delivery pump$=Q$ In a case where $X<Y$ (3)

a discharge speed of the primary plunger pump of the first liquid delivery pump$=A+(Q \times Y/X)$ a suction speed of the secondary plunger pump of the first liquid delivery pump$=Q \times X/Y$ a discharge speed of the primary plunger pump of the second liquid delivery pump$=B+Q$ a suction speed of the secondary plunger pump of the second liquid delivery pump$=Q$.

5. A liquid chromatograph comprising:
an analysis channel;
the liquid delivery device according to claim 1 for delivering a mobile phase in the analysis channel;
an autosampler for injecting a sample into the analysis channel;
a separation column that is provided downstream of the autosampler on the analysis channel, and for separating the sample injected into the analysis channel by the autosampler into components;
a detector that is provided downstream of the separation column on the analysis channel, and for detecting the components separated by the separation column; and
an injection timing adjustment part configured to provide a synchronization instruction indicating that operation states of the first liquid delivery pump and the second liquid delivery pump are to be synchronized to the liquid delivery device when analysis of the sample is started, and to provide an injection instruction indicating that the sample is to be injected into the analysis channel to the autosampler when operation states of the first liquid delivery pump and the second liquid delivery pump of the liquid delivery device are synchronized.

* * * * *